Patented May 14, 1940

2,200,485

UNITED STATES PATENT OFFICE

2,200,485

PROCESS OF DIMINISHING OR PREVENTING FOAMING

Karl Brodersen and Mathias Quaedvlieg, Dessau in Anhalt, Germany, assignors to I. G. Farbenindustrie Aktiengesellschaft, Frankfort-on-the-Main, Germany No Drawing. Application March 22, 1939, Serial No. 263,458. In Germany March 25, 1938

5 Claims.  (Cl. 252—6)

Our present invention relates to a process of diminishing or preventing foam.

In many technical processes, the formation of foam in certain liquids is undesired; in the textile industry, for instance, defective products are obtained if foam is produced in soap liquors used for treating fabrics, in sizing and finishing processes or the like. Likewise, frothing leads often to difficulties, for instance, in the distillation of liquids, especially if they are alkaline, and in many reactions in which gases are evolved. It has been proposed to prevent foaming by pouring on the foaming liquid an alcohol of high molecular weight, a hydrocarbon, a fat or an oil. However, these agents must be applied in very large quantities, furthermore they are in part volatile and their effect is only temporary.

This invention relates to a process of diminishing or preventing foaming wherein a phosphoric acid ester insoluble in water is used for destroying foam or for preventing the production of foam. Only very small amounts of such esters are required, as a rule, and their effect, moreover, is of long duration. The ester is preferably diluted with a water-soluble solvent, such as an alcohol, acetone, dioxane or the like. When these de-frothing agents are applied to aqueous solutions of foam-producing substances, the active phosphoric acid ester is subdivided into numerous very small drops, whereby an especially rapid action is guaranteed. The subjoined table illustrates the particularly good effect of such water-insoluble phosphoric acid esters. The following solutions are used for these comparative tests, which are intended to show the action of phosphoric acid easters upon existing foam: a solution of Marseilles soap, a solution of a commercial artificial washing agent (fatty acid condensation product) each containing per litre of distilled water 1 gram of the substance named, furthermore a solution of glue containing per litre 10 grams of glue, and a solution of a commercial sizing agent containing per litre 10 cc. of a water-soluble cellulose ether. Foam is produced by shaking 100 cc. of the solution in a measuring cylinder, 0.2 per cent. of the defrothing agent (calculated upon the volume) being added in each case. A commercial defrothing agent is used for comparative purposes.

*Decrease of foams already produced*

|  | Original height of foam | Height of foam after addition of defrothing agent (after 60 seconds) | |
|---|---|---|---|
|  |  | Commercial product | Product used in the process of the invention* |
| Marseilles soap | 200 cc. | 30 cc. | 20 cc. |
| Artificial washing agent. | 125 cc. | 50 cc. | 5 cc. |
| Glue | 100 cc. | 5 cc. | 5 cc. |
| Sizing liquor | 100 cc. | Practically destroyed after 15 sec. | Practically destroyed after 10 sec. |

*=a mixture from 60 parts of tributyl phosphate and 40 parts of isopropanol.

On longer standing, the foams subjected to the action of the phosphate are completely destroyed, whereas in the case of the comparative product there remains always some residues of foam.

The same solutions are subjected to shaking after addition of the defrothing agent and the degree of foaming is determined. The following numbers are found:

*New formation of foam*

|  | Commercial product | Product according to the present invention* |
|---|---|---|
|  | Cubic centimeters | Cubic centimeters |
| Marseilles soap | 70 | 60 |
| Artificial washing agent | 45 | 30 |
| Glue | 10 | 10 |

*=a mixture from 40 parts of tributyl phosphate and 60 parts of isopropanol.

The invention is not limited to the use of the phosphoric acid ester named above or to the use of the diluent named as an example. In the same manner, there may be used, for instance, mixtures consisting of 40 parts of triisobutyl phosphate and 60 parts of spirit or of 40 parts of dipropylphenyl phosphate and 60 parts of spirit.

Furthermore, in some cases the anti-foaming properties of the phosphates may be improved by the addition of small quantities of a dispersing agent such as, for instance, of dodecyl alcohol etherified with 6 mol of ethylene oxide.

What we claim is:

1. The process of preventing foaming of aqueous liquids which comprises adding to the liquid a water-insoluble neutral alkyl phosphoric acid ester in sufficient amounts to prevent foaming.

2. The process of preventing foaming of aqueous liquids which comprises adding to the liquid a water-insoluble neutral alkyl phosphoric acid ester and a water-soluble organic solvent in sufficient amounts to prevent foaming.

3. The process of preventing foaming of aqueous liquids which comprises adding to the liquid a tributylphosphate in sufficient amounts to prevent foaming.

4. The process of preventing foaming of aqueous liquids which comprises adding to the liquid a tributylphosphate and a water-soluble organic solvent in sufficient amounts to prevent foaming.

5. The process of preventing foaming of aqueous liquids which comprises adding to the liquid tributylphosphate and isopropanol in sufficient amounts to prevent foaming.

KARL BRODERSEN.
MATHIAS QUAEDVLIEG.